US012584623B2

(12) United States Patent
Kim

(10) Patent No.: US 12,584,623 B2
(45) Date of Patent: Mar. 24, 2026

(54) LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/960,380

(22) Filed: Nov. 26, 2024

(65) Prior Publication Data

US 2026/0043540 A1 Feb. 12, 2026

(30) Foreign Application Priority Data

Aug. 12, 2024 (KR) ........................ 10-2024-0107833

(51) Int. Cl.
*F21V 33/00* (2006.01)
*F21S 41/29* (2018.01)
*H04R 1/02* (2006.01)

(52) U.S. Cl.
CPC .......... *F21V 33/0056* (2013.01); *F21S 41/29* (2018.01); *H04R 1/028* (2013.01)

(58) Field of Classification Search
CPC ...... B60Q 5/00; B60Q 1/0017; B60Q 1/2626; B60Q 1/22; F21S 45/47; B60R 2013/0287; H04R 1/2811; H04R 7/10; H04R 7/045; H04R 2307/023; H04R 2307/025; G10K 9/122; G10K 9/125
See application file for complete search history.

(56) References Cited

U.S. PATENT DOCUMENTS

| | | | | |
|---|---|---|---|---|
| 3,928,777 A * | 12/1975 | Massa | B06B 1/0681 | 310/326 |
| 4,903,007 A * | 2/1990 | Gottlieb | B60Q 5/00 | 340/474 |
| 2013/0058121 A1* | 3/2013 | Tatara | G10K 9/22 | 362/546 |
| 2014/0146557 A1* | 5/2014 | Dums | F21S 41/285 | 362/520 |

* cited by examiner

*Primary Examiner* — Omar Rojas Cadima
(74) *Attorney, Agent, or Firm* — NSIP Law

(57) ABSTRACT

A lamp for a vehicle includes a lamp housing part including an internal space configured to accommodate a light source, an outer lens part coupled to one side of the lamp housing part and configured to cover the internal space, a vibration part fixed to the outer lens part, the vibration part including a polarized piezoelectric element, and a first electrode and a second electrode respectively facing two opposite sides based on a direction in which the piezoelectric element is polarized, and a cover member provided at one side of the vibration part and including a partial region facing the outer lens part with the vibration part interposed therebetween, the cover member including one or more vibration reduction holes, wherein the piezoelectric element is configured to output a sound by being vibrated by a change over time in voltage applied to the first electrode and the second electrode.

20 Claims, 26 Drawing Sheets

LAMP FOR VEHICLE

CROSS-REFERENCE TO RELATED APPLICATION

This application claims priority to and the benefit under 35 USC § 119 of Korean Patent Application No. 10-2024-0107833 filed in the Korean Intellectual Property Office on Aug. 12, 2024, the entire contents of which are incorporated herein by reference for all purposes.

BACKGROUND

1. Field

The present disclosure relates to a lamp for a vehicle, and more particularly, to a lamp for a vehicle that is capable of outputting a sound.

2. Description of the Related Art

Recently, with the increasing demand for entertainment functions in addition to transportation functions required for vehicles, there has been a growing need for lamps mounted in the vehicles and having additional functions in addition to simple lighting functions. For example, recently, a lamp for a vehicle has additionally adopted a function capable of performing communication with the outside.

In the related art, the lamp for a vehicle has performed the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

The present disclosure has been made in an effort to add a function which is capable of outputting a sound, to a lamp for a vehicle without affecting performance of the lamp for a vehicle.

In a general aspect of the disclosure, a lamp for a vehicle includes: a lamp housing part including an internal space configured to accommodate a light source; an outer lens part coupled to one side of the lamp housing part and configured to cover the internal space; a vibration part fixed to the outer lens part, the vibration part including a polarized piezoelectric element, and a first electrode and a second electrode respectively facing two opposite sides based on a direction in which the piezoelectric element is polarized; and a cover member provided at one side of the vibration part and including a partial region facing the outer lens part with the vibration part interposed therebetween, the cover member comprising one or more vibration reduction holes, wherein the piezoelectric element is configured to output a sound by being vibrated by a change over time in voltage applied to the first electrode and the second electrode.

A cover coupling member including one side may be fixed to the outer lens part to couple the cover to the cover coupling member, wherein the cover member may further include: a cover body facing the outer lens part with the vibration part interposed therebetween, the cover body spaced apart from the vibration part; and cover extension regions protruding from two opposite sides of the cover body toward the cover coupling member, and wherein the vibration reduction hole may be formed in the cover body.

The vibration reduction hole may be provided as a plurality of vibration reduction holes, wherein at least some of the plurality of vibration reduction holes may be disposed to be spaced apart from one another in a direction parallel to a direction in which the cover extension regions respectively formed at the two opposite sides of the cover body face each other.

The cover member may further include a cover rib protruding from the cover body toward the vibration part, wherein the cover rib may be attached to the vibration part.

A direction in which the cover extension regions respectively formed at the two opposite sides of the cover body face each other may be parallel to a direction in which the cover rib extends.

The cover rib may be provided as a plurality of cover ribs spaced apart from one another in a direction intersecting a direction in which the cover extension regions respectively formed at the two opposite sides of the cover body face each other.

The cover extension region may include a first through-hole, wherein the cover coupling member may include: a coupling body fixed to one side of the outer lens part; and a coupling extension region protruding from a peripheral region of the coupling body toward the cover member and including a second through-hole formed in a region corresponding to the first through-hole.

The cover body may be provided to face all two opposite peripheral regions of the piezoelectric element based on an extension direction of the piezoelectric element and a central region of the extension direction.

The vibration reduction holes may be formed in regions of the cover body that face the two opposite peripheral regions of the piezoelectric element based on the extension direction and the central region of the extension direction.

The cover member may be provided as a plurality of cover members spaced apart from one another.

The cover member may be provided as two cover members, wherein the two cover members may face each other with a central region of the coupling body interposed therebetween.

The plurality of cover members may be interchangeable with one another.

The first through-hole and the second through-hole may each have a circular shape.

A width of the first through-hole in a first direction D1 may be different from a width of the first through-hole in a second direction D2 intersecting the first direction D1.

A size of the first through-hole and a size of the second through-hole may be different from each other.

The first direction D1 may be a direction parallel to a direction in which the piezoelectric element faces the outer lens part, wherein the width of the first through-hole in the first direction D1 may be larger than the width of the first through-hole in the second direction D2.

The second direction D2 may be a direction parallel to a direction perpendicularly intersecting the first direction D1, wherein the width of the second through-hole in the second direction D2 may correspond to the width of the first through-hole in the second direction D2.

At least one of the coupling body may be inserted into the outer lens, or a size of the vibration reduction hole may be smaller than a size of the first through-hole.

The vibration reduction hole may be spaced apart from the cover rib.

In another general aspect of the disclosure, a lamp for a vehicle, includes: a lamp housing including an internal space to configured to accommodate a light source; an outer lens part coupled to one side of the lamp housing and configured to cover the internal space; a vibration part fixed to the outer lens part, the vibration part including a polarized piezoelectric element, and a first electrode and a second electrode respectively facing two opposite sides based on a direction in which the piezoelectric element is polarized; and a cover member provided at one side of the vibration part and including a partial region facing the outer lens part with the vibration part interposed therebetween, the cover member including one or more vibration reduction holes; and a controller configured to control voltage applied to the first electrode and the second electrode to vibrate the piezoelectric element to output sound.

DETAILED DESCRIPTION

Hereinafter, a lamp for a vehicle according to the present disclosure will be described with reference to the drawings.

Lamp for Vehicle

Figure 1:
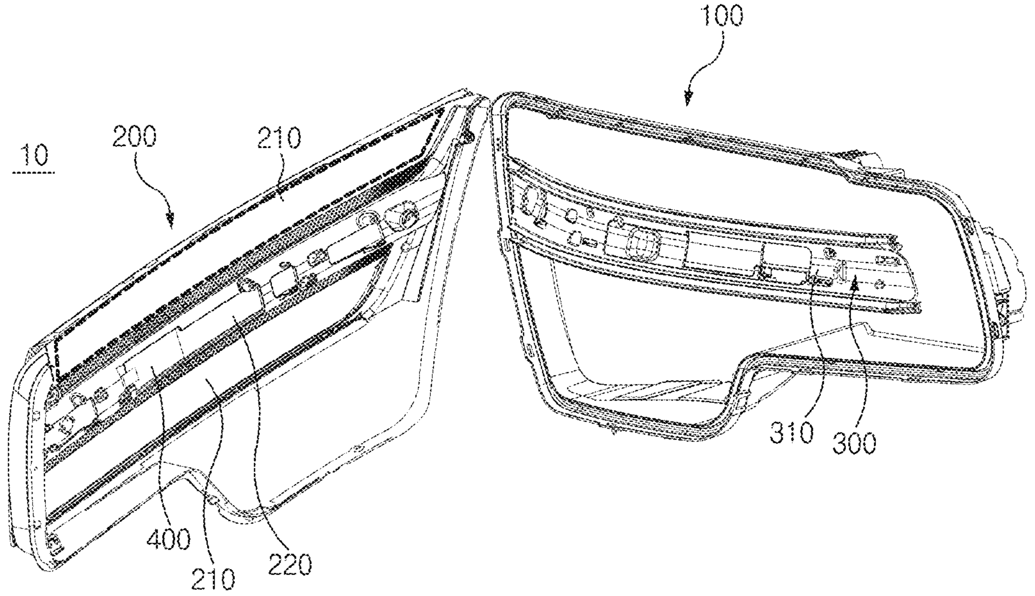
FIG. 1 is a view illustrating a state in which an outer lens part is spaced apart from a lamp housing part and a lamp bezel part in a lamp for a vehicle according to an example of the present disclosure.
Figure 2:
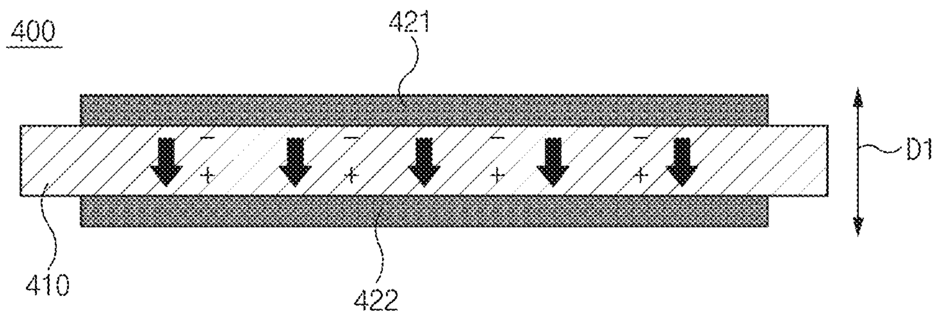
FIG. 2 is a cross-sectional view of a vibration part of the lamp for a vehicle according to the present disclosure, i.e., a view illustrating a state made before power is provided to an electrode.
Figure 3:
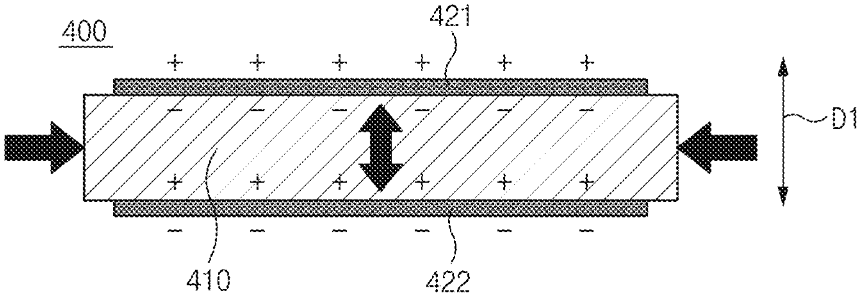
FIG. 3 is a cross-sectional view of the vibration part of the lamp for a vehicle according to the present disclosure, i.e., a view illustrating one state made after power is provided to the electrode.
Figure 4:
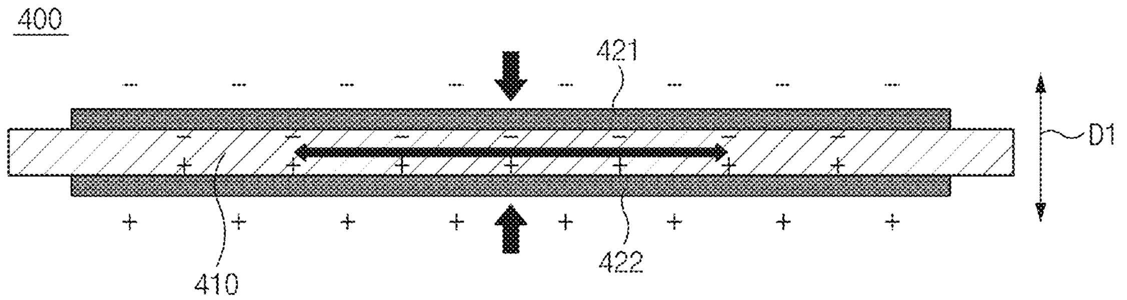
FIG. 4 is a cross-sectional view of the vibration part of the lamp for a vehicle according to the present disclosure, i.e., a view illustrating another state made after power is provided to the electrode.

FIG. 1 is a view illustrating a state in which an outer lens part is spaced apart from a lamp housing part and a lamp bezel part in a lamp for a vehicle according to an example of the present disclosure, and FIG. 2 is a cross-sectional view of a vibration part of the lamp for a vehicle according to the present disclosure, i.e., a view illustrating a state made before power is provided to an electrode. FIG. 3 is a cross-sectional view of the vibration part of the lamp for a vehicle according to the present disclosure, i.e., a view illustrating one state made after power is provided to the electrode, and FIG. 4 is a cross-sectional view of the vibration part of the lamp for a vehicle according to the present disclosure, i.e., a view illustrating another state made after power is provided to the electrode.

With reference to FIGS. 1 and 2, a lamp 10 for a vehicle (hereinafter, referred to as a 'lamp') according to the present disclosure may include a lamp housing part 100 having an internal space configured to accommodate a light source, and an outer lens part 200 coupled to one side of the lamp housing part 100 and configured to cover the internal space. More specifically, the outer lens part 200 may be fixedly coupled to the lamp housing part 100. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the lamp housing part 100 or the outer lens part 200.

In order to achieve the above-mentioned object, the lamp 10 according to the present disclosure may include a vibration part 400 fixed to the lamp housing part 100 or the outer lens part 200. The vibration part 400 may be configured to output a sound by vibrating the lamp housing part 100 or the outer lens part 200. For example, as illustrated in FIG. 1, the vibration part 400 may be fixed to the outer lens part 200. However, unlike the configuration illustrated in FIG. 1, the vibration part 400 may be fixed to the lamp housing part 100. Meanwhile, the vibration part 400 may be accommodated in the internal space formed in the lamp housing part 100.

With continued reference to FIG. 1, the lamp 10 according to the present disclosure may further include a lamp bezel part 300 having one side fixedly coupled to the lamp housing part 100, the lamp bezel part 300 being provided to at least partially face the outer lens part 200. More specifically, based on FIG. 1, one region of the outer lens part 200 may face the lamp bezel part 300 in case that the outer lens part 200 is assembled to the lamp housing part 100.

Meanwhile, the vibration part 400 of the lamp 10 according to the present disclosure may include a polarized piezoelectric element 410. That is, according to the present disclosure, the vibration part 400 may include the piezoelectric element 410 in a polarized state in which one side thereof is positively charged and the other side thereof is negatively charged unless a temperature becomes a Curie temperature or higher or exceeds a predetermined range and a reverse voltage is applied in a direction opposite to a direction of an electric field in the piezoelectric element. Any material may be used for the piezoelectric element 410 without limitation as long as the material can be polarized. For example, the piezoelectric element 410 may be made of a ceramic material. Meanwhile, in the present specification, as illustrated in FIGS. 2 to 4, a direction in which a positively charged region and a negatively charged region face each other in the piezoelectric element 410 is defined as a direction in which the piezoelectric element is polarized.

With continued reference to FIGS. 2 to 4, the lamp 10 according to the present disclosure may include a first electrode 421 and a second electrode 422 that are provided to respectively face two opposite sides based on the direction in which the piezoelectric element 410 is polarized. That is, the first electrode 421 and the second electrode 422 may be provided to respectively face or be in contact with the negatively charged region and the positively charged region in the piezoelectric element 410.

A process in which the lamp 10 according to the present disclosure outputs a sound will be described below. When power is supplied to the first electrode 421 and the second electrode 422 through a power supply part to be described below, the first electrode 421 and the second electrode 422 are charged. In particular, when power with alternating current is supplied to the first electrode 421 and the second electrode 422, voltages of the first electrode 421 and the second electrode 422 vary over time. Therefore, according to the present disclosure, an electric force applied to the piezoelectric element 410 by the first electrode 421 and the second electrode 422 also varies over time as voltages applied to the first electrode 421 and the second electrode 422 vary over time, such that the piezoelectric element 410 performs motions in a longitudinal direction thereof and a width direction thereof. The motions are converted into vibration of the piezoelectric element 410, and the lamp housing part 100 or the outer lens part 200 is vibrated by the vibration of the piezoelectric element 410, thereby outputting a sound to the outside. For example, as illustrated in FIG. 2, before power is supplied to the first electrode 421 and the second electrode 422, the first electrode 421 and the second electrode 422 are not electrified, such that an external force is not applied to the piezoelectric element 410. Then, as illustrated in FIG. 3, when a first time elapses after power is supplied to the first electrode 421 and the second electrode 422, the first electrode 421 and the second electrode 422 are positively and negatively charged, respectively, such that the piezoelectric element 410 expands in a thickness direction thereof while receiving forces in directions toward the first electrode 421 and the second electrode 422. Then, as illustrated in FIG. 4, when a second time elapses after the power is supplied to the first electrode 421 and the second electrode 422, the first electrode 421 and the second electrode 422 are negatively and positively charged, respectively, such that the piezoelectric element 410 contracts in the thickness direction thereof while receiving forces in directions away from the first electrode 421 and the second electrode 422. Thereafter, the states illustrated in FIGS. 2 to 4 are repeated, such that the piezoelectric element 410 vibrates. A controller (e.g., a processor) may be configured to control voltage applied to the first electrode 421 and the second electrode 422 to vibrate the piezoelectric element 410 to output sound.

Meanwhile, with reference back to FIG. 1, in addition, according to the present disclosure, the vibration part 400 may be provided at a position in the lamp 10 at which the vibration part 400 may be protected from external direct sunlight. More specifically, the vibration part 400 may be fixed to a region of the outer lens part 200 or the lamp housing part 100 in which visible ray permeability is low. For example, as illustrated in FIG. 1, in case that the vibration part 400 is fixed to the outer lens part 200, the outer lens part 200 may include a first outer lens region 210 having a transmittance rate for visible rays, i.e., a first transmittance rate, and a second outer lens region 220 having a transmittance rate for visible rays, i.e., a second transmittance rate lower than the first transmittance rate, and the vibration part 400 may be fixed to the second outer lens region 220. In contrast, in case that the vibration part 400 is fixed to the lamp housing part 100, the vibration part 400 may be fixed to a lower region of an inner surface of the lamp housing part 100. In this case, the sound generated by the vibration of the vibration part 400 may propagate in a forward/rearward direction through a lower side of the lamp, i.e., a lower side of the vehicle. Meanwhile, the piezoelectric element 410, which constitutes the vibration part 400, may have a plate shape.

Figure 5:
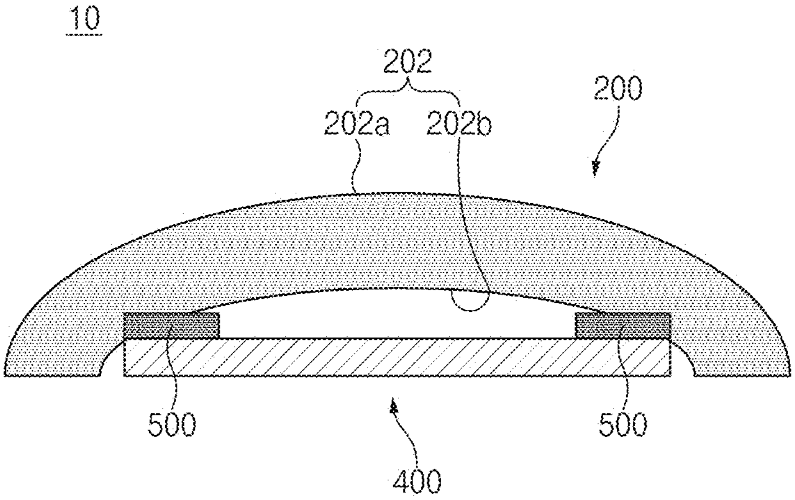
FIG. 5 is a cross-sectional view illustrating a state in which a vibration part is fixed to a curved surface region of an outer lens part by means of a bonding member in a lamp for a vehicle according to a first embodiment of the present disclosure.

FIG. 5 is a cross-sectional view illustrating a state in which a vibration part is fixed to a curved surface region of an outer lens part by means of a bonding member in a lamp for a vehicle according to a first embodiment of the present disclosure.

Meanwhile, with reference to FIGS. 1 and 5, a curved surface region 202 may be formed on at least a part of the outer lens part 200 to improve an aesthetic appearance of the lamp 10. For example, practically, an entire region of the outer lens part 200 may have a curved shape.

In this case, according to the present disclosure, the vibration part 400 may be fixed to the curved surface region 202. More particularly, the vibration part 400 may be bonded to the outer lens part 200 by means of a bondable material.

More specifically, the lamp 10 according to the present disclosure may further include a bonding member 500 provided between the outer lens part 200 and the vibration part 400 and configured to attach the vibration part 400 to the outer lens part 200. A non-woven fabric tape or the like may be used for the bonding member 500 to ensure rigidity against an external impact. The non-woven fabric tape may have a thicker adhesive layer than a general double-sided tape, and the adhesive layer may serve as a kind of cushion, thereby exhibiting excellent impact resistance.

Meanwhile, the outer lens part 200 may be divided into an outer portion and an inner portion. More specifically, the outer lens part 200 may be divided into an outer surface exposed to the outside of the lamp 10, and an inner surface facing an internal space of the lamp 10. Therefore, an outer section may be formed on an outer surface of the curved surface region 202 formed on the outer lens part 200, and an inner section may be formed on an inner surface of the curved surface region 202. For example, as illustrated in FIG. 5, an outer curved surface section 202*a* including a curved shape may be formed on the outer surface of the curved surface region 202, and an inner curved surface section 202*b* including a curved shape may be formed on the inner surface of the curved surface region 202. In this case, according to the first embodiment of the present disclosure, the vibration part 400 may be fixed to the inner curved surface section 202*b*, and the bonding member 500 may be provided in a peripheral region of the vibration part 400. More specifically, according to the first embodiment of the present disclosure, the vibration part 400 may have a flat shape, and the bonding member 500 may be provided in a region excluding a central region of the vibration part 400. Therefore, according to the first embodiment of the present disclosure, an empty space may be formed between the central region of the vibration part 400 and the inner curved surface section 202*b* (see the arrow in FIG. 5). As in the first embodiment of the present disclosure, the bonding member 500 may be provided only on the peripheral region excluding the central region of the vibration part 400, such that there may be an effect of improving the performance of the vibration part 400 in a low-frequency region in case that the empty space is formed between the central region of the vibration part 400 and the inner curved surface section 202*b*.

Figure 6:
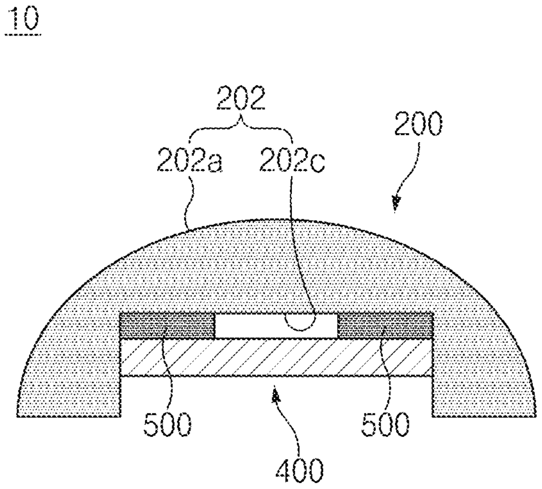
FIG. 6 is a cross-sectional view illustrating a state in which a vibration part is fixed to a curved surface region of an outer lens part by means of a bonding member in a lamp for a vehicle according to a second embodiment of the present disclosure.

FIG. 6 is a cross-sectional view illustrating a state in which a vibration part is fixed to a curved surface region of an outer lens part by means of a bonding member in a lamp for a vehicle according to a second embodiment of the present disclosure. A difference from the first embodiment of the present disclosure described above with reference to FIG. 5 will be mainly described with reference to FIG. 6. The above-mentioned contents described above with reference to FIGS. 1 to 5 may be equally applied to the contents excluding the contents to be described below with reference to FIG. 6.

With reference to FIG. 6, the outer curved surface section 202*a* including a curved shape may be formed on the outer surface of the curved surface region 202 of the outer lens part 200, whereas an inner flat surface section 202*c* having a flat shape may be formed on the inner surface of the curved surface region 202. For example, the inner flat surface section 202*c* may be formed by additionally processing a part of the curved surface section formed on the inner surface of the outer lens part 200.

In this case, according to the second embodiment of the present disclosure, the vibration part 400 may be fixed to the inner flat surface section 202*c*. In this case, the bonding member 500 may be provided only on the peripheral region of the vibration part 400 without being provided on the central region of the vibration part 400. In this case, similar to the first embodiment of the present disclosure, the performance of the vibration part 400 may be improved in a low-frequency region. However, according to the second embodiment of the present disclosure, the vibration part 400 may be fixed to the outer lens part 200 by means of the inner flat surface section 202*c*, such that the performance in fixing the vibration part 400 to the outer lens part 200 may be further improved.

Figure 7:
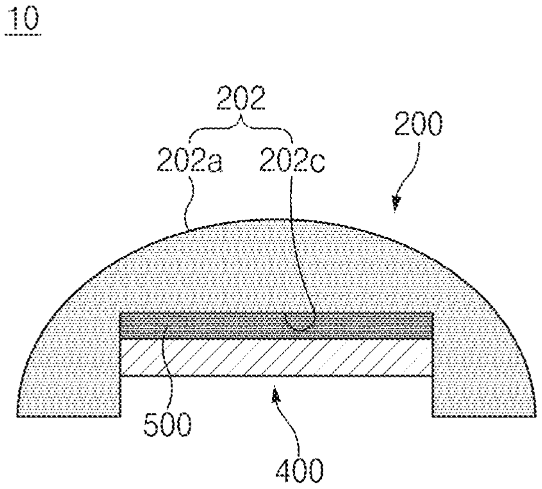
FIG. 7 is a cross-sectional view illustrating a state in which a vibration part is fixed to a curved surface region of an outer lens part by means of a bonding member in a lamp for a vehicle according to a third embodiment of the present disclosure.

FIG. 7 is a cross-sectional view illustrating a state in which a vibration part is fixed to a curved surface region of an outer lens part by means of a bonding member in a lamp for a vehicle according to a third embodiment of the present disclosure.

Like the second embodiment of the present disclosure, the outer curved surface section 202*a* and the inner flat surface section 202*c* may also be formed on the curved surface region 202 according to the third embodiment of the present disclosure. However, according to the third embodiment of the present disclosure, the bonding member 500 may be provided on both the peripheral region and the central region of the vibration part 400.

Meanwhile, as described above, the outer lens part 200 may include the first outer lens region 210 and the second outer lens region 220 depending on the transmittance rate for visible rays, and the curved surface region 202 may be formed on the second outer lens region 220.

Figure 8:
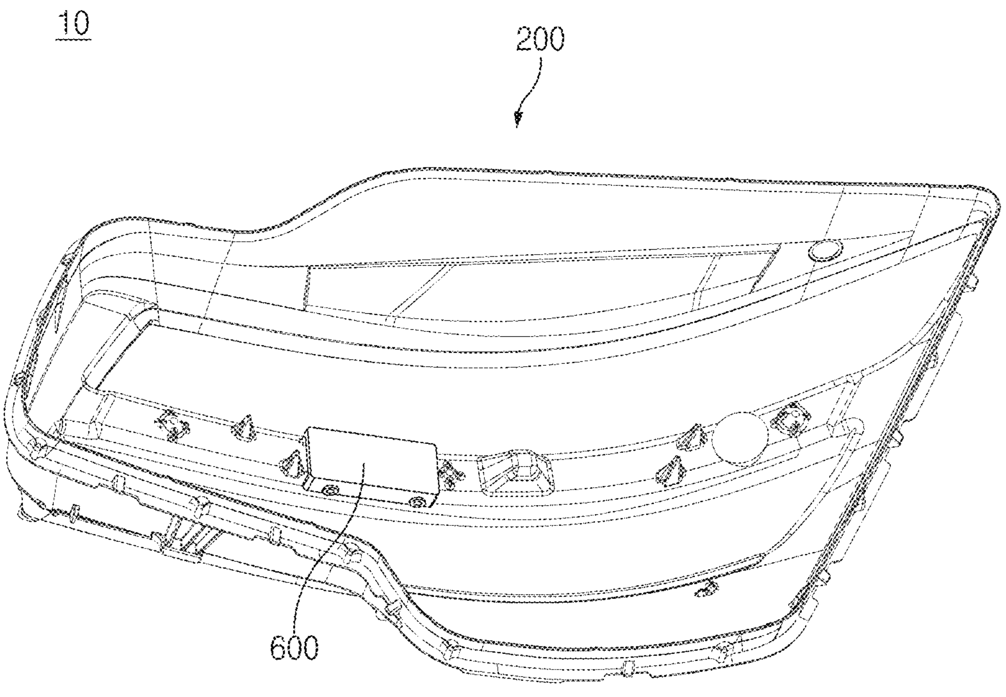
FIG. 8 is a perspective view of a lamp for a vehicle according to a fourth embodiment of the present disclosure.
Figure 9:
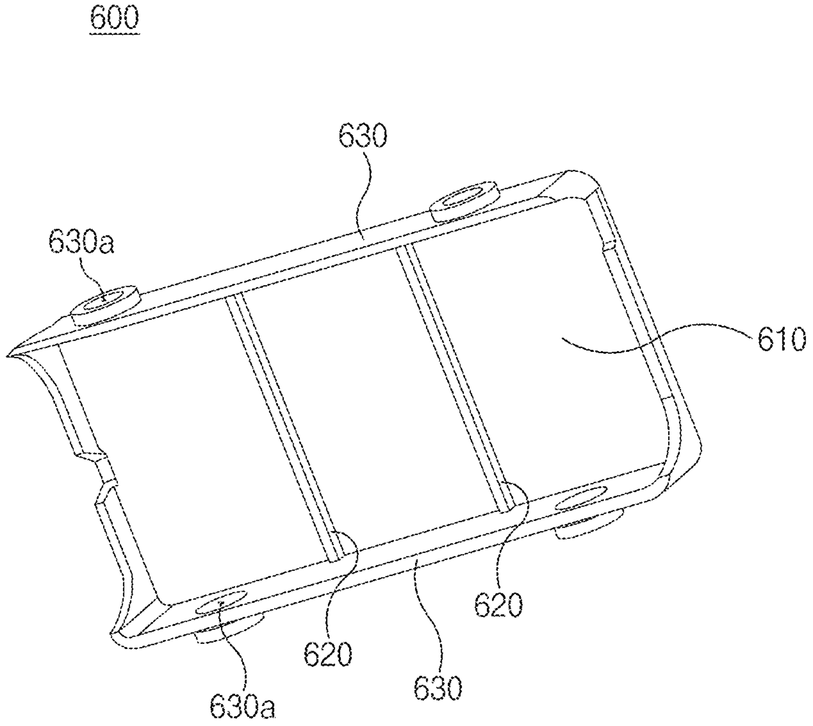
FIG. 9 is an enlarged perspective view illustrating a cover member in FIG. 8.
Figure 10:
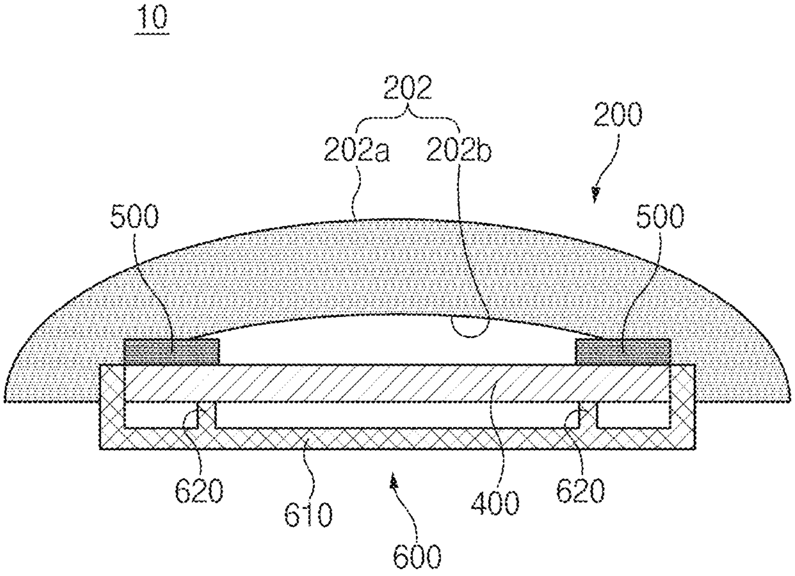
FIG. 10 is an enlarged cross-sectional view illustrating a vibration part and the cover member in FIG. 8, and surrounding components thereof.
Figure 11:
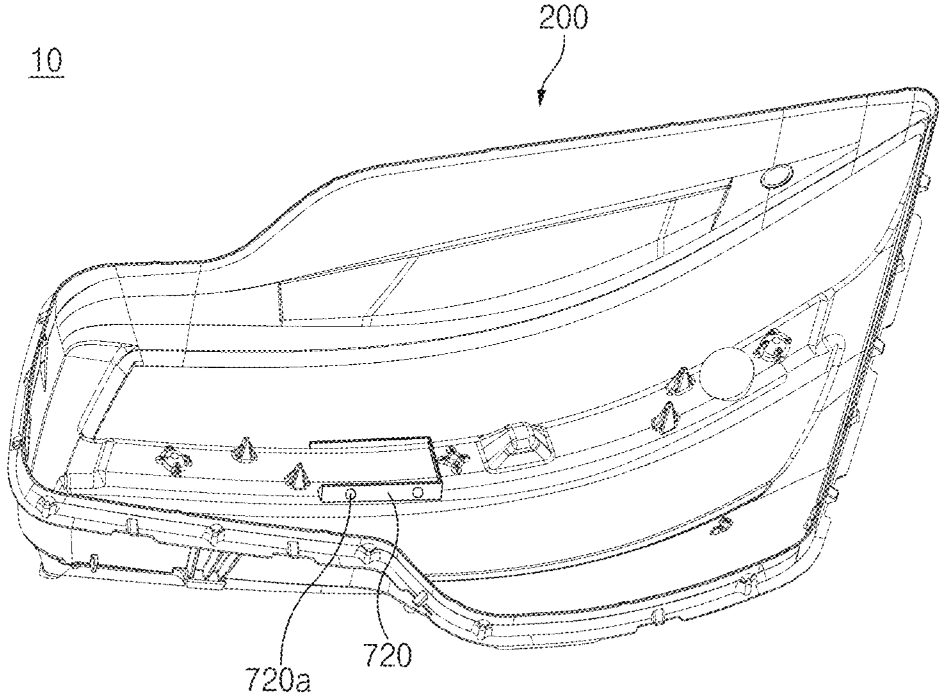
FIG. 11 is a perspective view illustrating a state in which the cover member in FIG. 8 is removed.
Figure 12:
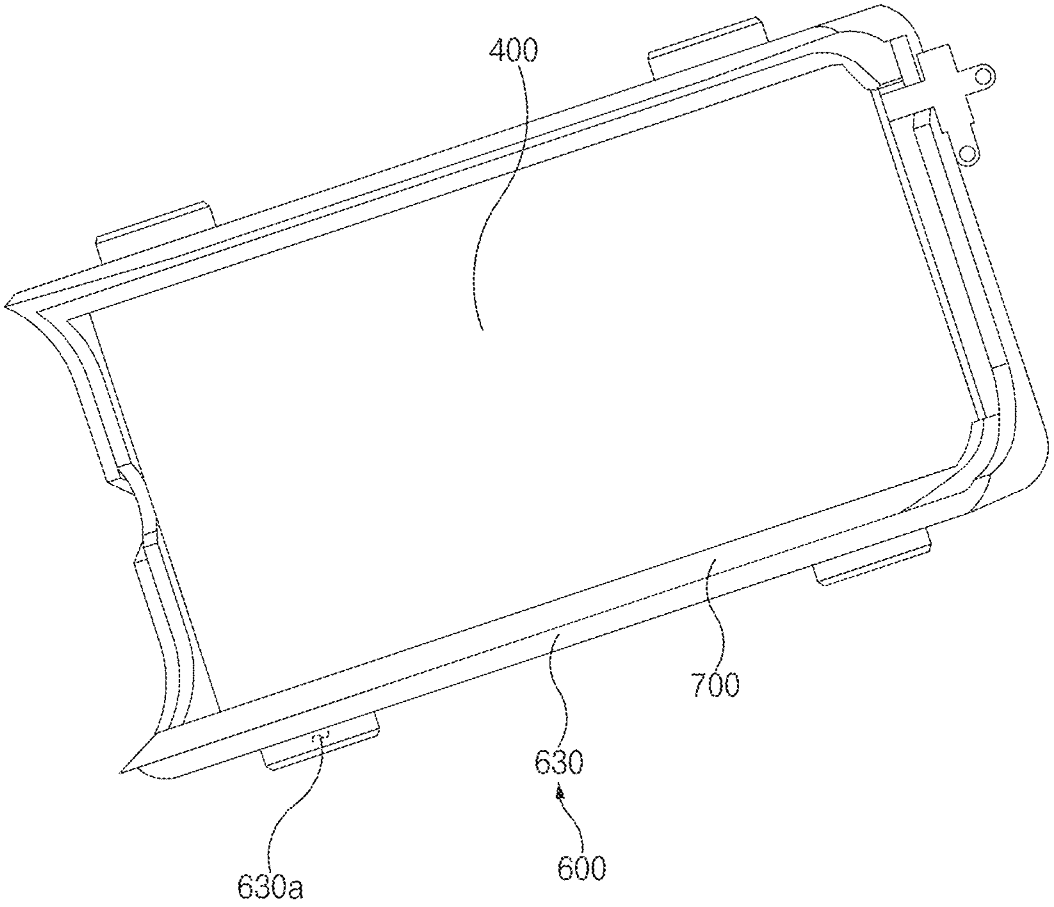
FIG. 12 is an enlarged view illustrating a state in which the vibration part, the cover member, and a cover coupling member in FIG. 8 are coupled.

FIG. 8 is a perspective view of a lamp for a vehicle according to a fourth embodiment of the present disclosure, and FIG. 9 is an enlarged perspective view illustrating a cover member in FIG. 8. FIG. 10 is an enlarged cross-sectional view illustrating a vibration part and the cover member in FIG. 8, and surrounding components thereof, and FIG. 11 is a perspective view illustrating a state in which the cover member in FIG. 8 is removed. FIG. 12 is an enlarged view illustrating a state in which the vibration part, the cover member, and a cover coupling member in FIG. 8 are coupled.

The lamp 10 according to the fourth embodiment of the present disclosure may also include the lamp housing part, the outer lens part, and the vibration part. However, the lamp 10 according to the fourth embodiment of the present disclosure may further include a component configured to cover the vibration part, in addition to the above-mentioned components.

More specifically, the lamp 10 according to the present disclosure may further include the lamp housing part 100 having the internal space for accommodating the light source, the outer lens part 200 coupled to one side of the lamp housing part 100 and configured to cover the internal space, the vibration part 400 fixed to the outer lens part 200, and a cover member 600 provided at one side of the vibration part 400 and having at least a partial region provided to face the outer lens part 200 with the vibration part 400 interposed therebetween. The cover member 600 may be configured to fix the vibration part 400 to the outer lens part 200 together with the bonding member 500. To this end, at least a part of a region of the cover member 600, which faces the outer lens part 200 with the vibration part 400 interposed therebetween, may be provided to be tightly attached to the vibration part 400.

Meanwhile, according to the present disclosure, there may be additionally provided a means for minimizing a region of the cover member 600 that presses the vibration part 400, thereby preventing the cover member 600 from absorbing vibration of the vibration part 400 when the vibration part 400 vibrates to output a sound.

More specifically, as illustrated in FIGS. 9 and 10, the cover member 600 may include a cover body 610 provided to face the outer lens part 200 with the vibration part 400 interposed therebetween, the cover body 610 being provided to be spaced apart from the vibration part 400, and cover ribs 620 protruding from the cover body 610 toward the vibration part 400 and provided to be tightly attached to the vibration part 400. The cover body 610 may have a plate shape, and the cover rib 620 may have a shape protruding from a partial region of the plate-shaped structure toward the vibration part 400. That is, the vibration part 400 may be fixed to the outer lens part 200 by being supported by the cover rib 620. For example, the cover rib 620 may have a rod structure with a straight shape.

Meanwhile, the lamp 10 according to the fourth embodiment of the present disclosure may further include a component having one side fixed to the outer lens part 200 so that the cover member 600 is coupled to the component. More specifically, as illustrated in FIGS. 8 to 12, the lamp 10 according to the present disclosure may further include a cover coupling member 700 having one side fixed to the outer lens part 200 so that the cover member 600 is coupled to the cover coupling member 700. In this case, the cover member 600 may further include cover extension regions 630 protruding from two opposite sides of the cover body 610 toward the cover coupling member 700 and having first through-holes 630*a*. In addition, the cover coupling member 700 may include a coupling body 710 fixed to one side of the outer lens part 200, and coupling extension regions 720 protruding from a peripheral region of the coupling body 710 toward the cover member and having second through-holes formed in regions corresponding to the first through-holes.

The cover member 600 and the cover coupling member 700 may be fixedly coupled to each other on the cover extension regions 630 and the coupling extension regions 720. More specifically, the lamp 10 according to the present disclosure may further include penetration members 800 configured to penetrate the first through-holes 630*a* of the cover extension regions 630 and second through-holes 720*a* of the coupling extension regions 720. For example, the penetration member 800 may be bolt-nut-coupled to the first through-hole 630*a* and the second through-hole 720*a*.

Meanwhile, according to the fourth embodiment of the present disclosure, the cover ribs 620 may be provided as a plurality of cover ribs 620. More specifically, a direction in which the cover extension regions 630 respectively provided at the two opposite sides of the cover body 610 face each other may be parallel to a direction in which the cover rib 620 extends. The plurality of cover ribs 620 may be provided to be spaced apart from one another in a direction intersecting the direction in which the cover extension regions 630 respectively formed at the two opposite sides of the cover body 610 face each other. For example, FIG. 9 illustrates a state in which the cover member 600 has two cover ribs 620.

Meanwhile, according to the present disclosure, a part of the cover coupling member 700 may be inserted into the outer lens part 200. More specifically, as illustrated in FIG. 11, the coupling body 710 may be inserted into the outer lens part 200.

Figure 13:
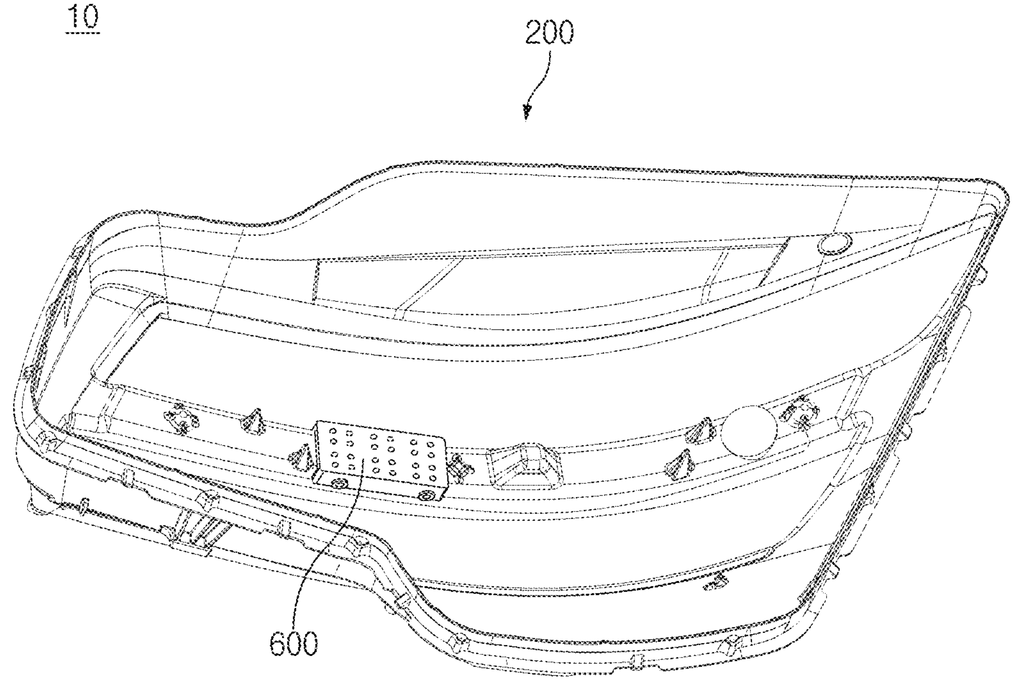
FIG. 13 is a perspective view of a lamp for a vehicle according to a fifth embodiment of the present disclosure.
Figure 14:
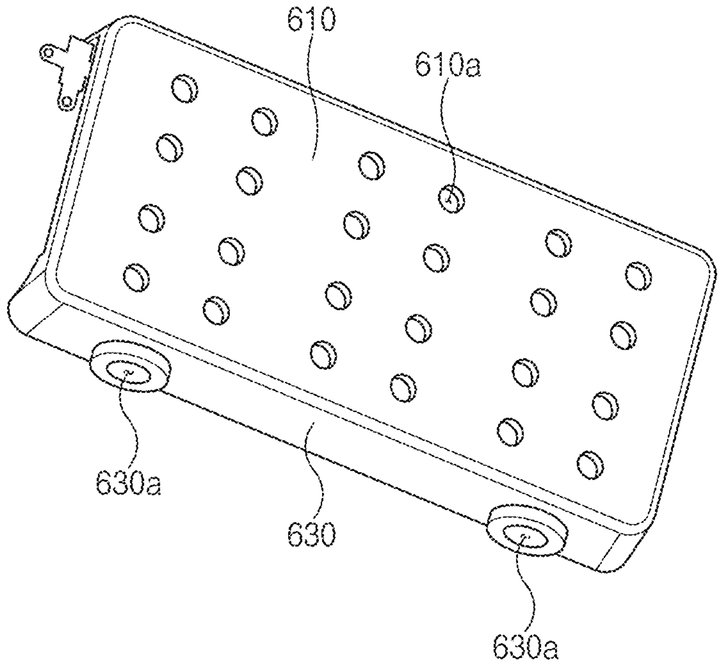
FIG. 14 is an enlarged view illustrating a coupling structure between a cover member and a vibration part in FIG. 13.
Figure 15:
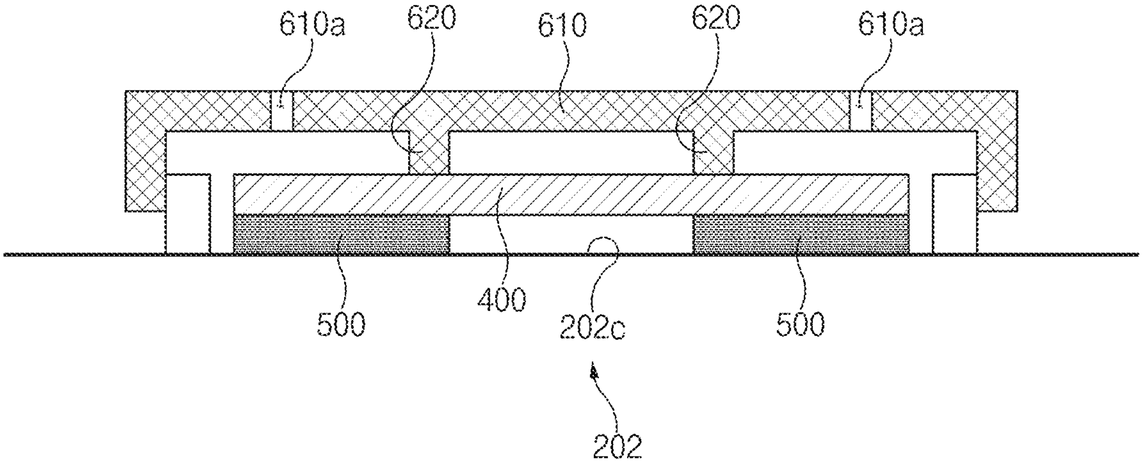
FIG. 15 is an enlarged cross-sectional view illustrating the vibration part and the cover member in FIG. 13, and surrounding components thereof.

FIG. 13 is a perspective view of a lamp for a vehicle according to a fifth embodiment of the present disclosure, and FIG. 14 is an enlarged view illustrating a coupling structure between a cover member and a vibration part in FIG. 13. FIG. 15 is an enlarged cross-sectional view illustrating the vibration part and the cover member in FIG. 13, and surrounding components thereof.

The contents of the lamps according to the first to fourth embodiments of the present disclosure may be equally applied to the lamp 10 according to the fifth embodiment of the present disclosure. However, the fifth embodiment of the present disclosure differs from the above-mentioned embodiments in that the cover member 600 may additionally have a component for reducing vibration of the cover member 600.

As illustrated in FIGS. 13 to 15, one or more vibration reduction holes 610*a* may be formed in the cover member 600. More particularly, the vibration reduction holes 610*a* may be provided as a plurality of vibration reduction holes 610*a*. The vibration reduction holes 610*a* may be configured to minimize vibrational energy to be transferred from the vibration part 400 to the cover member 600. In addition, the vibration reduction holes 610*a* may also serve to allow the vibrational energy transferred to the cover member 600 to be eliminated without being diffused. For example, the vibration reduction holes 610*a* may be formed in the cover body 610 of the cover member 600.

As described above, the vibration reduction holes 610*a* may be provided as a plurality of vibration reduction holes 610*a*. In this case, as illustrated in FIGS. 13 and 14, at least some of the plurality of vibration reduction holes 610*a* may be disposed to be spaced apart from one another in a direction parallel to the direction in which the cover extension regions 630 respectively formed at the two opposite sides of the cover body 610 face each other. FIGS. 13 and 14 illustrate that there are provided six groups each including four vibration reduction holes 610*a* provided to be spaced apart from one another in the direction parallel to the direction in which the cover extension regions 630 face each other.

With continued reference to FIG. 13, the cover body 610 provided in the cover member 600 of the lamp 10 according to the fifth embodiment of the present disclosure may be provided to face all the two opposite peripheral regions of the piezoelectric element 410 based on an extension direction of the piezoelectric element 410 and the central region of the piezoelectric element 410 based on the extension direction. More particularly, the cover body 610 may be provided to surround an entire region of the piezoelectric element 410. In this case, the vibration reduction holes 610*a* may be formed in regions of the cover body 610 that face the two opposite peripheral regions of the piezoelectric element 410 based on the extension direction and the central region of the piezoelectric element 410 based on the extension direction. FIGS. 13 and 14 illustrate that two vibration reduction hole groups each including four vibration reduction holes 610*a* are formed in each of the regions of the cover body 610 that face the two opposite peripheral regions and the central region of the piezoelectric element 410.

Figure 16:
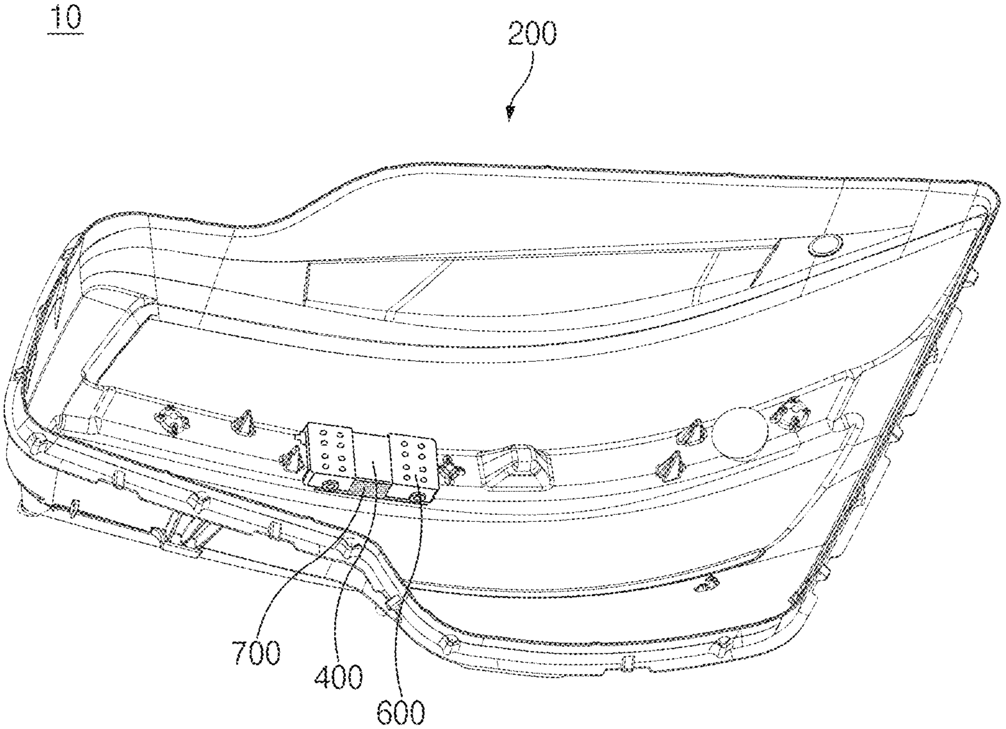
FIG. 16 is a perspective view of a lamp for a vehicle according to a sixth embodiment of the present disclosure.
Figure 17:
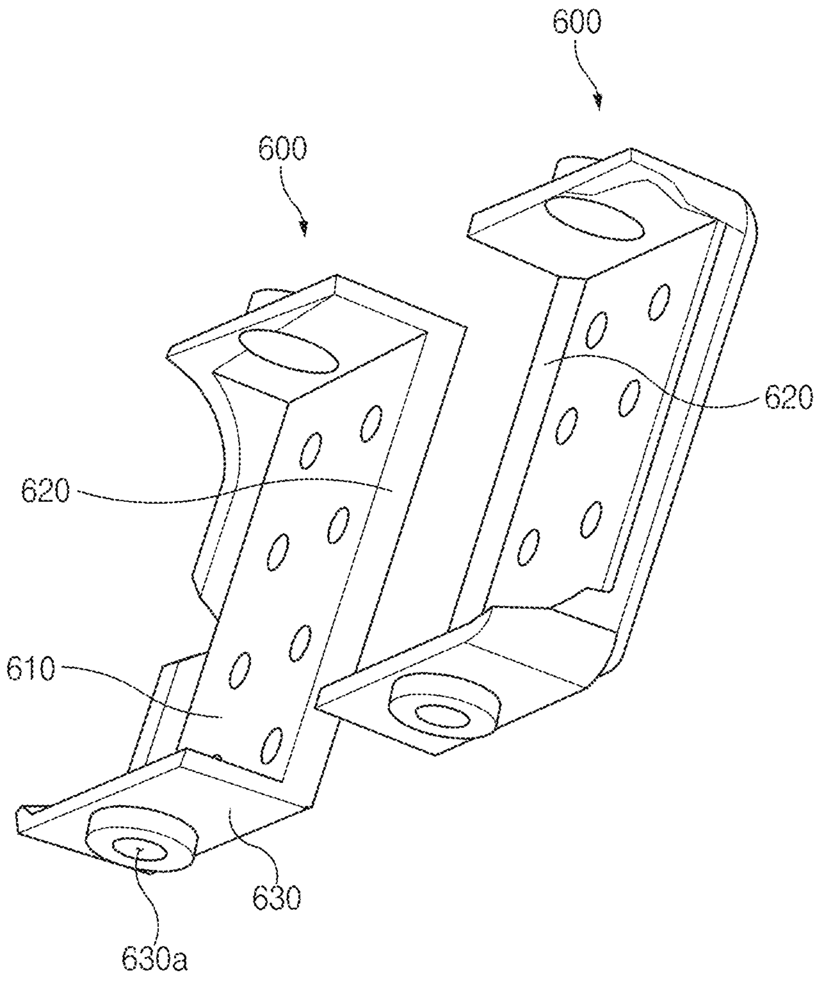
FIG. 17 is a perspective view of a cover member in FIG. 16.
Figure 18:
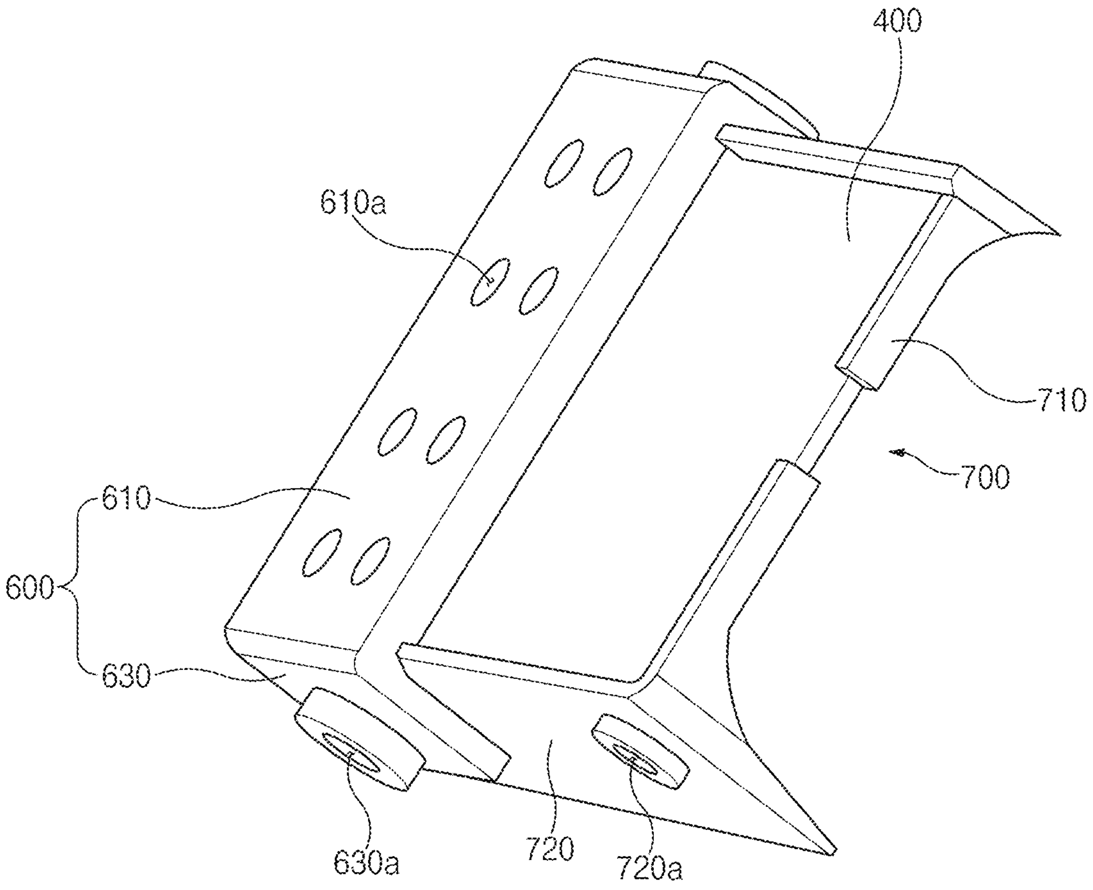
FIG. 18 is an enlarged view illustrating a state in which a vibration part, the cover member, and a cover coupling member in FIG. 16 are coupled.

FIG. 16 is a perspective view of a lamp for a vehicle according to a sixth embodiment of the present disclosure, and FIG. 17 is a perspective view of a cover member in FIG. 16. FIG. 18 is an enlarged view illustrating a state in which a vibration part, the cover member, and a cover coupling member in FIG. 16 are coupled.

The contents of the lamps according to the first to fourth embodiments of the present disclosure may be equally applied to the lamp 10 according to the sixth embodiment of the present disclosure. As in the fifth embodiment of the present disclosure, the vibration reduction holes 610*a* may be formed in the cover member 600. However, according to the sixth embodiment of the present disclosure, the lamp 10 may have a plurality of cover members 600.

That is, according to the sixth embodiment of the present disclosure, the plurality of cover members 600 may be provided to be spaced apart from one another. For example, as illustrated in FIGS. 16 and 17, two cover members 600 may be provided, the two cover members 600 may be provided to face each other with a central region of the coupling body 710 of the cover coupling member 700 interposed therebetween.

More particularly, the two cover members 600 may be identical to each other to the extent that the two cover members 600 are interchangeable with each other. This configuration may be interpreted as a configuration in which even though the two cover members 600 do not have physically completely the same shape, the two cover members 600 are identical to each other to the extent that the two cover members 600 exhibit the functions thereof when the two cover members 600 are assembled after the positions thereof are interchanged.

Meanwhile, according to the fifth and sixth embodiments of the present disclosure, a size of each of the vibration reduction holes 610*a* may be smaller than a size of the first through-hole 630*a* and a size of the second through-hole 720*a*.

In addition, as illustrated in FIG. 15, the vibration reduction holes 610*a* may be provided to be spaced apart from the cover ribs 620. It may be understood that the vibration reduction hole 610*a* is not formed in a region of the cover body 610 in which the cover ribs 620 extend.

Meanwhile, according to the fourth to sixth embodiments of the present disclosure, a size of the first through-hole 630*a* formed in the cover extension region 630 and a size of the second through-hole 720*a* formed in the coupling extension region 720 may correspond to each other. More particularly, the first and second through-holes 630*a* and 720*a* may have circular shapes having diameters corresponding to each other.

Figure 19:
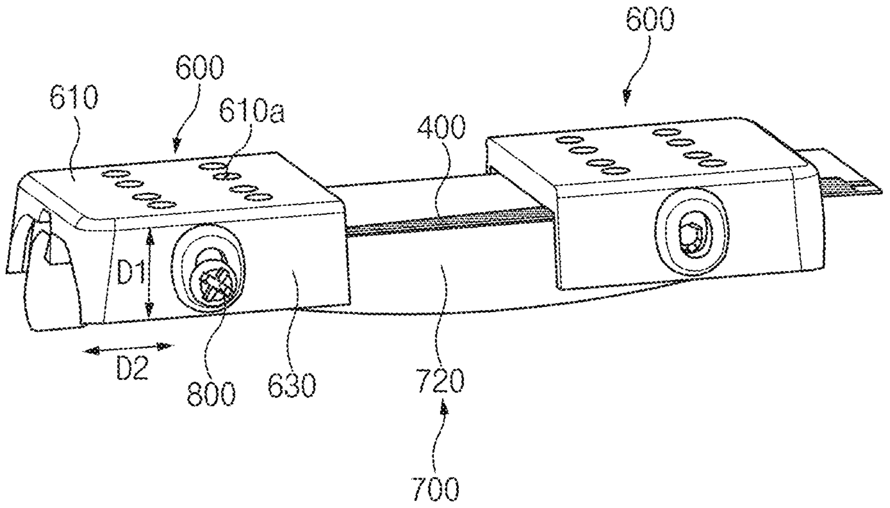
FIG. 19 is an enlarged view illustrating a coupling structure between a vibration part, a cover member, and a cover coupling member provided in a lamp for a vehicle according to a seventh embodiment of the present disclosure.
Figure 20:
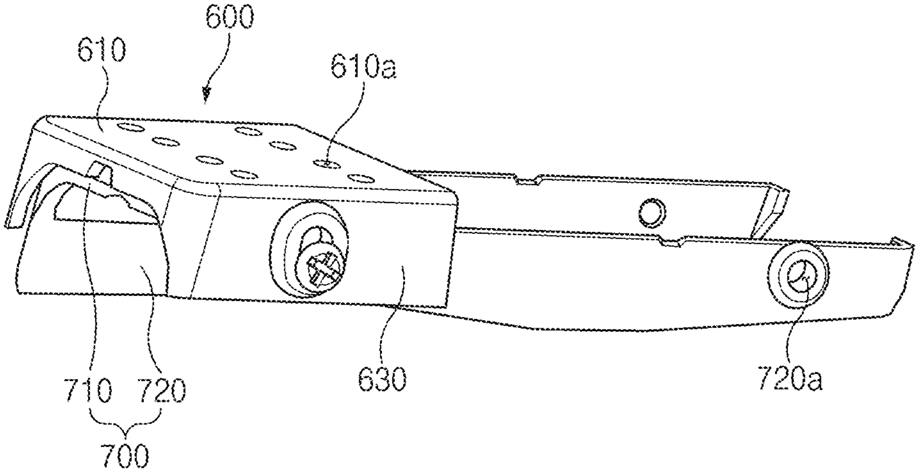
FIG. 20 is a view for explaining a coupling structure between the cover member and the cover coupling member in FIG. 19.
Figure 21:
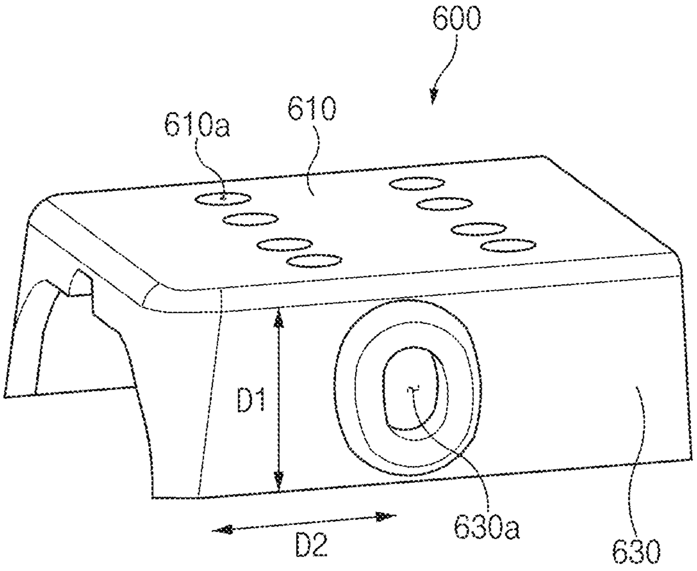
FIG. 21 is an enlarged view illustrating the cover member in FIG. 19.

FIG. 19 is an enlarged view illustrating a coupling structure between a vibration part, a cover member, and a cover coupling member provided in a lamp for a vehicle according to a seventh embodiment of the present disclosure, and FIG. 20 is a view for explaining a coupling structure between the cover member and the cover coupling member in FIG. 19. FIG. 21 is an enlarged view illustrating the cover member in FIG. 19.

The contents of the lamps according to the first to sixth embodiments of the present disclosure may be equally applied to the lamp 10 according to the seventh embodiment of the present disclosure. However, according to the seventh embodiment of the present disclosure, a size of the first through-hole 630*a* and a size of the second through-hole 720*a* may be different from each other.

More specifically, according to the seventh embodiment of the present disclosure, a width of the first through-hole 630*a* in a first direction D1 may be different from a width of the first through-hole 630*a* in a second direction D2 intersecting the first direction D1. In addition, a size and shape of the first through-hole 630*a* may be different from a size and shape of the second through-hole 720*a*. For example, the second through-hole 720*a* may have a circular shape. Meanwhile, in the present specification, the first direction D1 may be defined as a direction parallel to a direction in which the piezoelectric element 410 faces the outer lens part 200, and the second direction D2 may be defined as a direction parallel to a direction perpendicularly intersecting the first direction D1, i.e., defined as a direction perpendicularly intersecting a direction in which the first through-hole 630*a* penetrates the cover extension region 630. More particularly, the width of the first through-hole 630*a* in the first direction D1 may be larger than the width of the first through-hole 630*a* in the second direction D2. In addition, the width of the second through-hole 720*a* in the second direction D2 may correspond to the width of the first through-hole 630*a* in the second direction D2.

According to the seventh embodiment of the present disclosure, when the cover member 600 and the cover coupling member 700 are coupled to each other, a relative positional relationship between the cover member 600 and the cover coupling member 700 may be variable. That is, according to the seventh embodiment of the present disclosure, the relative positional relationship between the first through-hole 630*a* and the second through-hole 720*a* in the first direction D1 may vary depending on a thickness of the vibration part 400. In this case, because the first through-hole 630*a* has a relatively long shape in the first direction D1, a region in which the penetration member 800 is inserted into the first through-hole 630*a* may vary depending on the thickness of the vibration part 400. Therefore, according to the seventh embodiment of the present disclosure, assemblability between the cover member 600 and the cover coupling member 700 may be improved.

Figure 22:
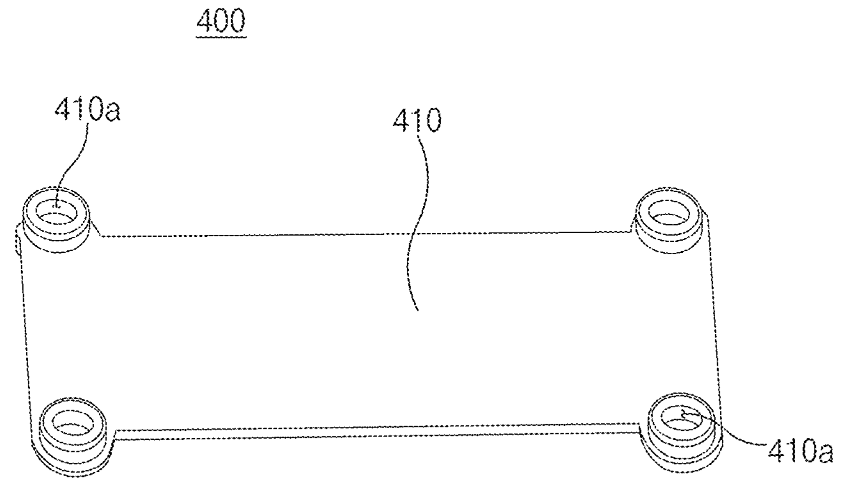
FIG. 22 is a view illustrating a piezoelectric element of a vibration part provided in a lamp for a vehicle according to an eighth embodiment of the present disclosure.
Figure 23:
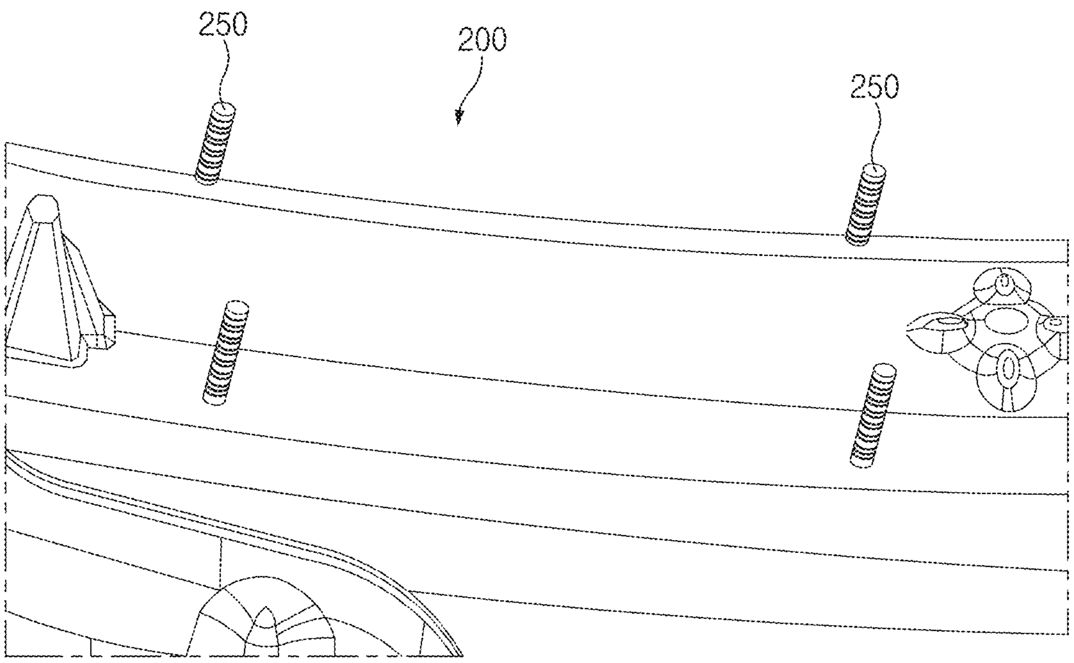
FIG. 23 is a view illustrating a first example of an outer lens part to which the vibration part illustrated in FIG. 22 is fixed.
Figure 24:
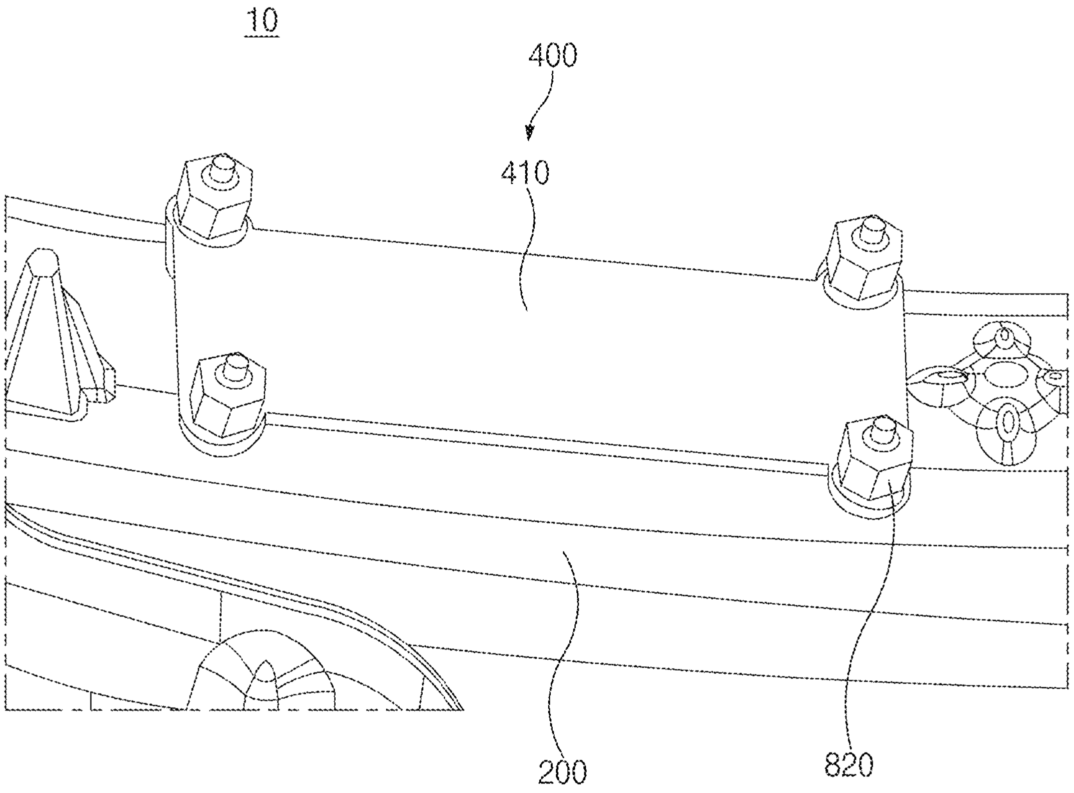
FIG. 24 is a view illustrating a state in which the vibration part in FIG. 22 is coupled to the outer lens part in FIG. 23.
Figure 25:
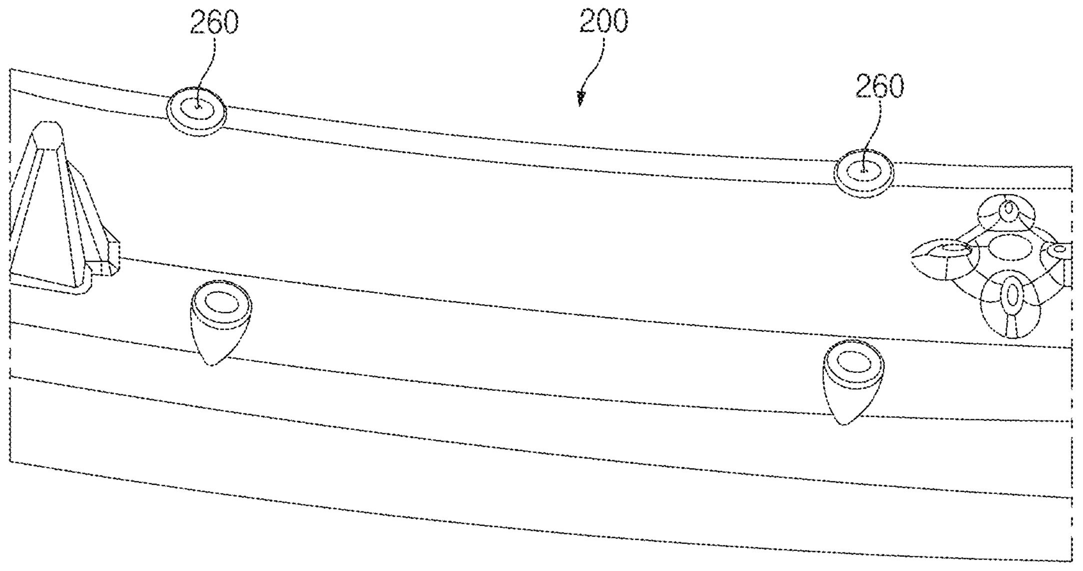
FIG. 25 is a view illustrating a second example of the outer lens part to which the vibration part illustrated in FIG. 22 is fixed.
Figure 26:
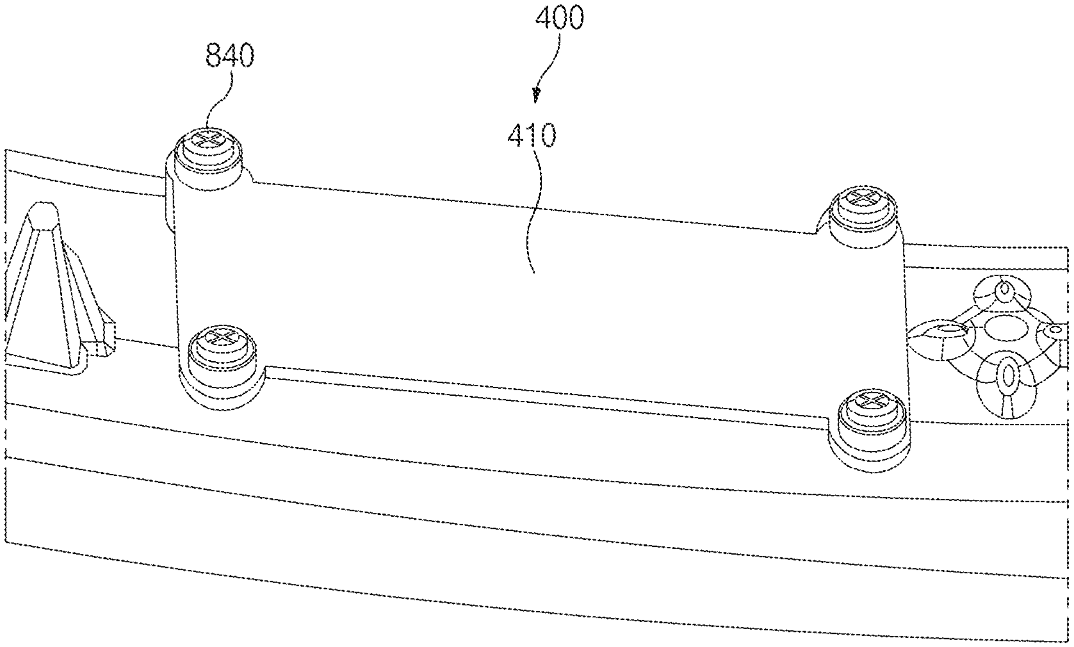
FIG. 26 is a view illustrating a state in which the vibration part in FIG. 22 is coupled to the outer lens part in FIG. 25.

FIG. 22 is a view illustrating a piezoelectric element of a vibration part provided in a lamp for a vehicle according to an eighth embodiment of the present disclosure, and FIG. 23 is a view illustrating a first example of an outer lens part to which the vibration part illustrated in FIG. 22 is fixed. FIG. 24 is a view illustrating a state in which the vibration part in FIG. 22 is coupled to the outer lens part in FIG. 23, and FIG. 25 is a view illustrating a second example of the outer lens part to which the vibration part illustrated in FIG. 22 is fixed. FIG. 26 is a view illustrating a state in which the vibration part in FIG. 22 is coupled to the outer lens part in FIG. 25.

Like the lamps according to the first to third embodiments of the present disclosure, the lamp 10 according to the eighth embodiment of the present disclosure may be fixed to a curved surface region. However, the eighth embodiment of the present disclosure differs from the above-mentioned embodiments in that the vibration part 400 may be coupled directly to one side of the outer lens part 200.

More specifically, according to the eighth embodiment of the present disclosure, the piezoelectric element 410 of the vibration part 400 may be in contact with and fixed to one side of the outer lens part 200. More specifically, the piezoelectric element 410 may be bolt-nut-coupled to one side of the outer lens part 200.

For example, as illustrated in FIGS. 22 to 24, according to the first example of the eighth embodiment of the present disclosure, element through-holes 410*a* may be formed at one side of the piezoelectric element 410, and lens bolt regions 250, which penetrate the element through-holes 410*a*, may be formed on regions of one side of the outer lens part 200 that correspond to the element through-holes 410*a*. In addition, the lamp 10 according to the first example of the eighth embodiment of the present disclosure may further include nut members 820 tightly attached to the piezoelectric element 410 and inserted into the lens bolt region 250.

In contrast, as illustrated in FIGS. 22, 25, and 26, according to the second example of the eighth embodiment of the present disclosure, the element through-holes 410*a* may be formed at one side of the piezoelectric element 410, and lens through-holes 260 may be formed on regions of one side of the outer lens part 200 that correspond to the element through-holes 410*a*. In this case, the lamp 10 according to the present disclosure may further include bolt members 840 inserted into the element through-holes 410*a* and the lens through-holes 260.

Meanwhile, according to the eighth embodiment of the present disclosure, the region of the piezoelectric element 410 in which the element through-hole 410*a* is formed may be made of the same material as another region of the piezoelectric element 410. In addition, more particularly, the element through-hole 410*a* may be formed in a peripheral region of the piezoelectric element 410. For example, as illustrated in FIG. 22, the piezoelectric element 410 may have a quadrangular plate shape, and the element through-holes 410*a* may be respectively formed in vertex regions of the quadrangular plate shape.

Hereinafter, various control methods using the lamp according to the present disclosure will be described.

A sound outputted by the vibration part in the lamp according to the present disclosure may be used as a horn sound of the vehicle. For example, the lamp according to the present disclosure may be controlled by step i) of identifying input information on a horn sound inputted to the vehicle and step ii) of outputting a sound by the vibration part in response to the input information. The input information may be the time for which a driver in the vehicle pushes a horn button provided on a steering wheel in the vehicle. In this case, according to the present disclosure, the lamp may be controlled so that a magnitude of the sound outputted by the vibration part increases as the time for which the horn button is pushed increases. For example, in case that the time for which the horn button is pushed is in a first section, a magnitude of the sound outputted by the vibration part may be a first magnitude. In case that the time for which the horn button is pushed is in a second section longer than the first section, a magnitude of the sound outputted by the vibration part may be a second magnitude larger than the first magnitude.

Meanwhile, in the lamp according to the present disclosure, the output of the sound generated by vibration part may be controlled by manipulating an external device. For example, the lamp according to the present disclosure may be controlled by step i) of measuring a distance between the external device and the vehicle or the lamp by manipulating the external device (e.g., a smart key) and step ii) of outputting a magnitude of the sound outputted by the vibration part of the lamp in response to the distance between the external device and the vehicle or the lamp. For example, the magnitude of the sound outputted by the vibration part of the lamp may be controlled to be increased as the distance between the external device and the vehicle or the lamp increases.

In addition, the sound outputted from the lamp according to the present disclosure may vary depending on a distance between surrounding pedestrians and the vehicle having the lamp. For example, the lamp according to the present disclosure may be controlled by step i) of identifying a distance between a pedestrian around the vehicle and the vehicle, which is equipped with the lamp, or the lamp and step ii) of outputting a magnitude of the sound outputted by the vibration part of the lamp in response to the distance between the vehicle or lamp and the pedestrian. For example, the magnitude of the sound outputted by the vibration part of the lamp may be controlled to be increased as the distance between the vehicle or lamp and the pedestrian decreases.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

DESCRIPTION OF REFERENCE NUMERALS

10: Lamp for vehicle
100: Lamp housing part
200: Outer lens part
202: Curved surface region
202*a*: Outer curved surface section
202*b*: Inner curved surface section
202*c*: Inner flat surface section
210: First outer lens region
220: Second outer lens region
250: Lens bolt region
260: Lens through-hole
300: Lamp bezel part
400: Vibration part
410: Piezoelectric element
410*a*: Element through-hole
421: First electrode
422: Second electrode
500: Bonding member
600: Cover member
610: Cover body
610*a*: Vibration reduction hole
620: Cover rib
630: Cover extension region
630*a*: First through-hole
700: Cover coupling member
710: Coupling body
720: Coupling extension region
720*a*: Second through-hole
800: Penetration member
820: Nut member
840: Bolt member
D1: First direction
D2: Second direction

What is claimed is:

1. A lamp for a vehicle, the lamp comprising:
a lamp housing part including an internal space configured to accommodate a light source;
an outer lens part coupled to one side of the lamp housing part and configured to cover the internal space;
a vibration part fixed to the outer lens part, the vibration part including:
a polarized piezoelectric element; and
a first electrode and a second electrode respectively facing two opposite sides based on a direction in which the piezoelectric element is polarized; and
a cover member provided at one side of the vibration part and including a partial region facing the outer lens part with the vibration part interposed therebetween, the cover member comprising one or more vibration reduction holes,
wherein the piezoelectric element is configured to output a sound by being vibrated by a change over time in voltage applied to the first electrode and the second electrode.

2. A lamp for a vehicle, the lamp comprising:
a lamp housing part including an internal space configured to accommodate a light source;
an outer lens part coupled to one side of the lamp housing part and configured to cover the internal space;

a vibration part fixed to the outer lens part, the vibration part including:

a polarized piezoelectric element; and a first electrode and a second electrode respectively facing two opposite sides based on a direction in which the piezoelectric element is polarized; and a cover member provided at one side of the vibration part and including a partial region facing the outer lens part with the vibration part interposed therebetween, the cover member comprising one or more vibration reduction holes; and a cover coupling member including one side fixed to the outer lens part to couple the cover to the cover coupling member, wherein the piezoelectric element is configured to output a sound by being vibrated by a change over time in voltage applied to the first electrode and the second electrode, wherein the cover member further comprises:

a cover body facing the outer lens part with the vibration part interposed therebetween, the cover body spaced apart from the vibration part; and cover extension regions protruding from two opposite sides of the cover body toward the cover coupling member, and wherein the one or more vibration reduction holes is formed in the cover body.

3. The lamp of claim 2, wherein the one or more vibration reduction holes is provided as a plurality of vibration reduction holes, and wherein at least some of the plurality of vibration reduction holes are disposed to be spaced apart from one another in a direction parallel to a direction in which the cover extension regions respectively formed at the two opposite sides of the cover body face each other.

4. The lamp of claim 2, wherein the cover member further comprises a cover rib protruding from the cover body toward the vibration part, and wherein the cover rib is attached to the vibration part.

5. The lamp of claim 4, wherein a direction in which the cover extension regions respectively formed at the two opposite sides of the cover body face each other is parallel to a direction in which the cover rib extends.

6. The lamp of claim 4, wherein the cover rib is provided as a plurality of cover ribs spaced apart from one another in a direction intersecting a direction in which the cover extension regions respectively formed at the two opposite sides of the cover body face each other.

7. The lamp of claim 2, wherein the cover extension region includes a first through-hole, and wherein the cover coupling member comprises:

a coupling body fixed to one side of the outer lens part; and a coupling extension region protruding from a peripheral region of the coupling body toward the cover member and including a second through-hole formed in a region corresponding to the first through-hole.

8. The lamp of claim 2, wherein the cover body is provided to face all two opposite peripheral regions of the piezoelectric element based on an extension direction of the piezoelectric element and a central region of the extension direction.

9. The lamp of claim 8, wherein the one or more vibration reduction holes are formed in regions of the cover body that face the two opposite peripheral regions of the piezoelectric element based on the extension direction and the central region of the extension direction.

10. The lamp of claim 7, wherein the cover member is provided as a plurality of cover members spaced apart from one another.

11. The lamp of claim 10, wherein the cover member is provided as two cover members, and wherein the two cover members face each other with a central region of the coupling body interposed therebetween.

12. The lamp of claim 10, wherein the plurality of cover members are interchangeable with one another.

13. The lamp of claim 7, wherein the first through-hole and the second through-hole each have a circular shape.

14. The lamp of claim 7, wherein a width of the first through-hole in a first direction D1 is different from a width of the first through-hole in a second direction D2 intersecting the first direction D1.

15. The lamp of claim 14, wherein a size of the first through-hole and a size of the second through-hole are different from each other.

16. The lamp of claim 14, wherein the first direction D1 is a direction parallel to a direction in which the piezoelectric element faces the outer lens part, and wherein the width of the first through-hole in the first direction D1 is larger than the width of the first through-hole in the second direction D2.

17. The lamp of claim 16, wherein the second direction D2 is a direction parallel to a direction perpendicularly intersecting the first direction D1, and wherein the width of the second through-hole in the second direction D2 corresponds to the width of the first through-hole in the second direction D2.

18. The lamp of claim 7, wherein at least one of:

the coupling body is inserted into the outer lens; or a size of the vibration reduction hole is smaller than a size of the first through-hole.

19. The lamp of claim 4, wherein the one or more vibration reduction holes is spaced apart from the cover rib.

20. A lamp for a vehicle, the lamp comprising:

a lamp housing including an internal space to configured to accommodate a light source;

an outer lens part coupled to one side of the lamp housing and configured to cover the internal space;

a vibration part fixed to the outer lens part, the vibration part including:

a polarized piezoelectric element; and a first electrode and a second electrode respectively facing two opposite sides based on a direction in which the piezoelectric element is polarized; and a cover member provided at one side of the vibration part and including a partial region facing the outer lens part with the vibration part interposed therebetween, the cover member including one or more vibration reduction holes; and a controller configured to control voltage applied to the first electrode and the second electrode to vibrate the piezoelectric element to output sound.

* * * * *